United States Patent
Baik (10) Patent No.: US 7,561,513 B2
(45) Date of Patent: Jul. 14, 2009

(54) METHOD AND APPARATUS FOR CONTROLLING A PACKET TERMINATING CALL IN A MOBILE COMMUNICATION SYSTEM

(75) Inventor: Woon-Song Baik, Uiwang-si (KR)

(73) Assignee: LG Electroncis Inc., Seoul (KR)

( * ) Notice: Subject to any disclaimer, the term of this patent is extended or adjusted under 35 U.S.C. 154(b) by 826 days.

(21) Appl. No.: 10/634,910

(22) Filed: Aug. 6, 2003

(65) Prior Publication Data

US 2005/0195792 A1 Sep. 8, 2005

(30) Foreign Application Priority Data

Dec. 31, 2002 (KR) .................. 10-2002-0087825

(51) Int. Cl.
*H04L 12/26* (2006.01)
(52) U.S. Cl. .................................. 370/230
(58) Field of Classification Search .......... 370/229, 370/230, 252, 310, 328, 329, 431, 437, 464, 370/465; 709/227–230, 238
See application file for complete search history.

(56) References Cited

U.S. PATENT DOCUMENTS

| 6,738,361 B1 * | 5/2004 | Immonen et al. ............ 370/328 |
| 6,980,512 B2 * | 12/2005 | Uskela et al. ............... 370/230 |
| 7,010,305 B2 * | 3/2006 | Immonen et al. .......... 455/452.2 |
| 2001/0036175 A1 * | 11/2001 | Hurtta ......................... 370/352 |
| 2002/0012338 A1 | 1/2002 | Uskela et al. |
| 2002/0032800 A1 * | 3/2002 | Puuskari et al. ............. 709/246 |
| 2003/0115328 A1 * | 6/2003 | Salminen et al. ............ 709/225 |

FOREIGN PATENT DOCUMENTS

| CN | 1350247 A | 5/2002 |
| KR | 2001-0010386 | 2/2001 |

OTHER PUBLICATIONS

Office Action issued by Patent Office of the People's Republic of China dated Jul. 29, 2005.
Notification of the Second Chinese Office Action dated Nov. 16, 2007, with its English translation.
Korean Office Action dated Feb. 22, 2005.

* cited by examiner

*Primary Examiner*—Dmitry Levitan
(74) *Attorney, Agent, or Firm*—Ked & Associates LLP (57) ABSTRACT

A method and apparatus for controlling a packet terminating call in a mobile communication system enables a termination subscriber to selectively receive the packet terminating call addressed to the subscriber. This is accomplished by determining whether to set the terminating call of the received packet based on preset packet terminating call filtering information and then setting the terminating call based on a result of determination, so that the subscriber can actively use the packet radio network service. Also, since packets unnecessary to the subscriber are intercepted early, the load of packet network nodes is significantly reduced and the use efficiency of wire/radio resources is vastly improved.

15 Claims, 7 Drawing Sheets

METHOD AND APPARATUS FOR CONTROLLING A PACKET TERMINATING CALL IN A MOBILE COMMUNICATION SYSTEM

BACKGROUND OF THE INVENTION

1. Field of the Invention

The present invention relates to mobile communication systems, and more particularly to a method and apparatus for controlling a packet terminating call in a mobile communication system.

2. Discussion of the Related Art

Generally, a general packet radio service (GPRS) network represents a wire network of a radio service provider for providing a packet service. A related-art communication network for providing a packet service is shown in the block diagram of FIG. 1.

Figure 1:
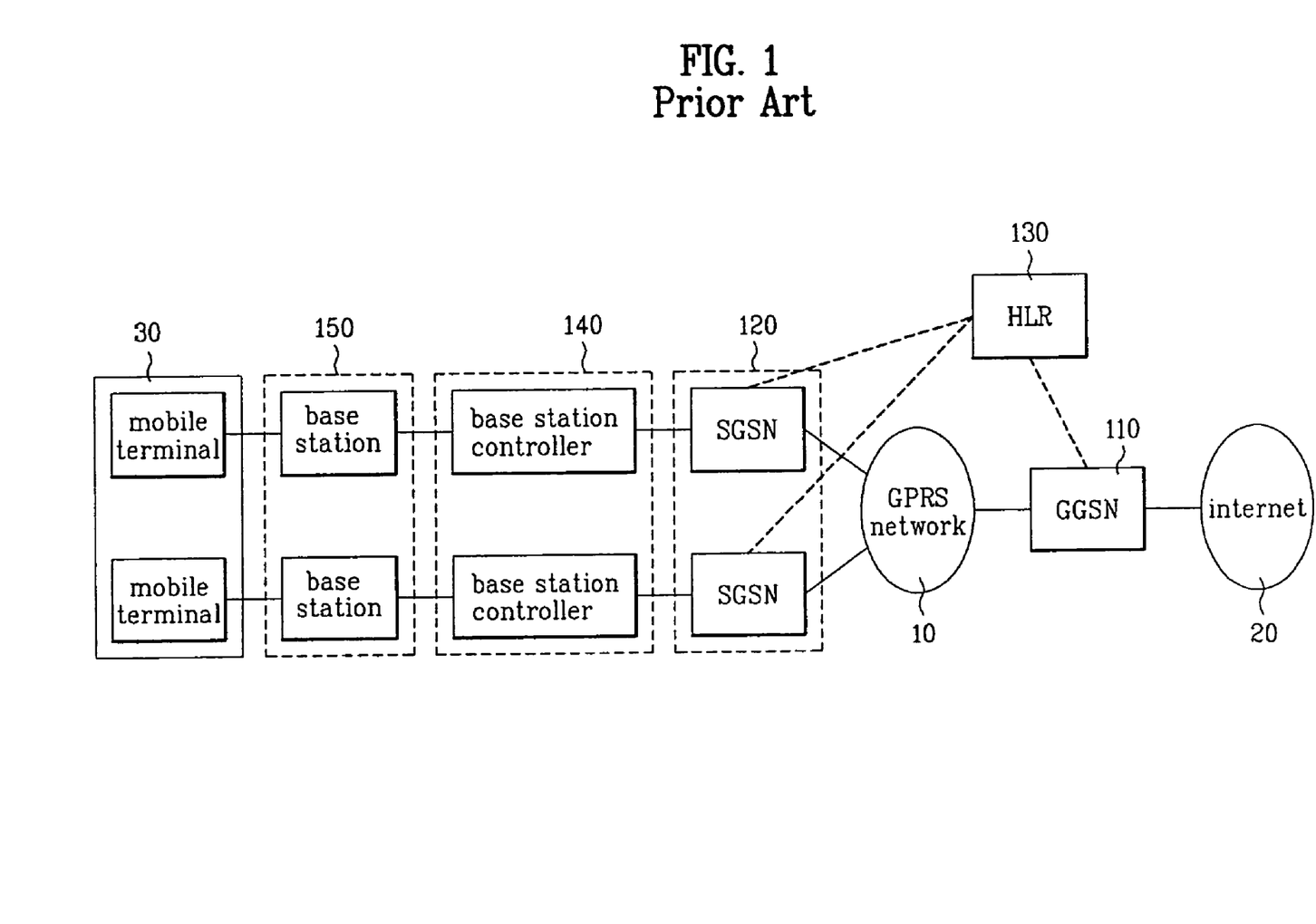
FIG. 1 is a block diagram illustrating the construction of a related-art communication network for providing a packet service.

The FIG. 1 network includes a gateway GPRS support node (GGSN) 110, a serving GPRS support node (SGSN) 120, a home location register (HLR) 130, a base station controller (BSC) 140, and a base station (BS) 150.

The GGSN 110 performs a function of a gateway for interworking between the GPRS network 10 and the Internet 20 or an external packet network (not illustrated). The SGSN 120 is connected to the GGSN 110 through the GPRS network 10, manages the mobility of a mobile terminal (MT) 30 in a packet mode, and performs a function of a packet switch. The HLR 130 is connected to the GGSN 110 and the SGSN 120, and manages subscription information and location information of a subscriber. The BSC 140 controls and manages the BS 150, and the BS 150 manages radio resources and transfers data by allocating a traffic channel. Also, the MT 30 denotes a subscriber's terminal that can receive a packet service.

A general packet terminating call process in the related-art communication network of FIG. 1 will now be explained. If a packet data protocol packet data unit (PDP PDU) is received from the Internet 20 or another external packet network, the GGSN 110 checks whether a PDP context for a PDP address exists in the PDP PDU. If it is checked that the corresponding PDP context exists, the GGSN performs a first packet terminating call process that encodes the received PDP PDU and transfers the encoded PDP PDU to the corresponding SGSN 120 to which the corresponding terminating subscriber belongs.

If it is checked that the corresponding PDP context does not exist, the GGSN performs a second packet terminating call process that determines whether to proceed with a terminating process of the received PDP PDU based on static information of the subscriber.

Figure 2:
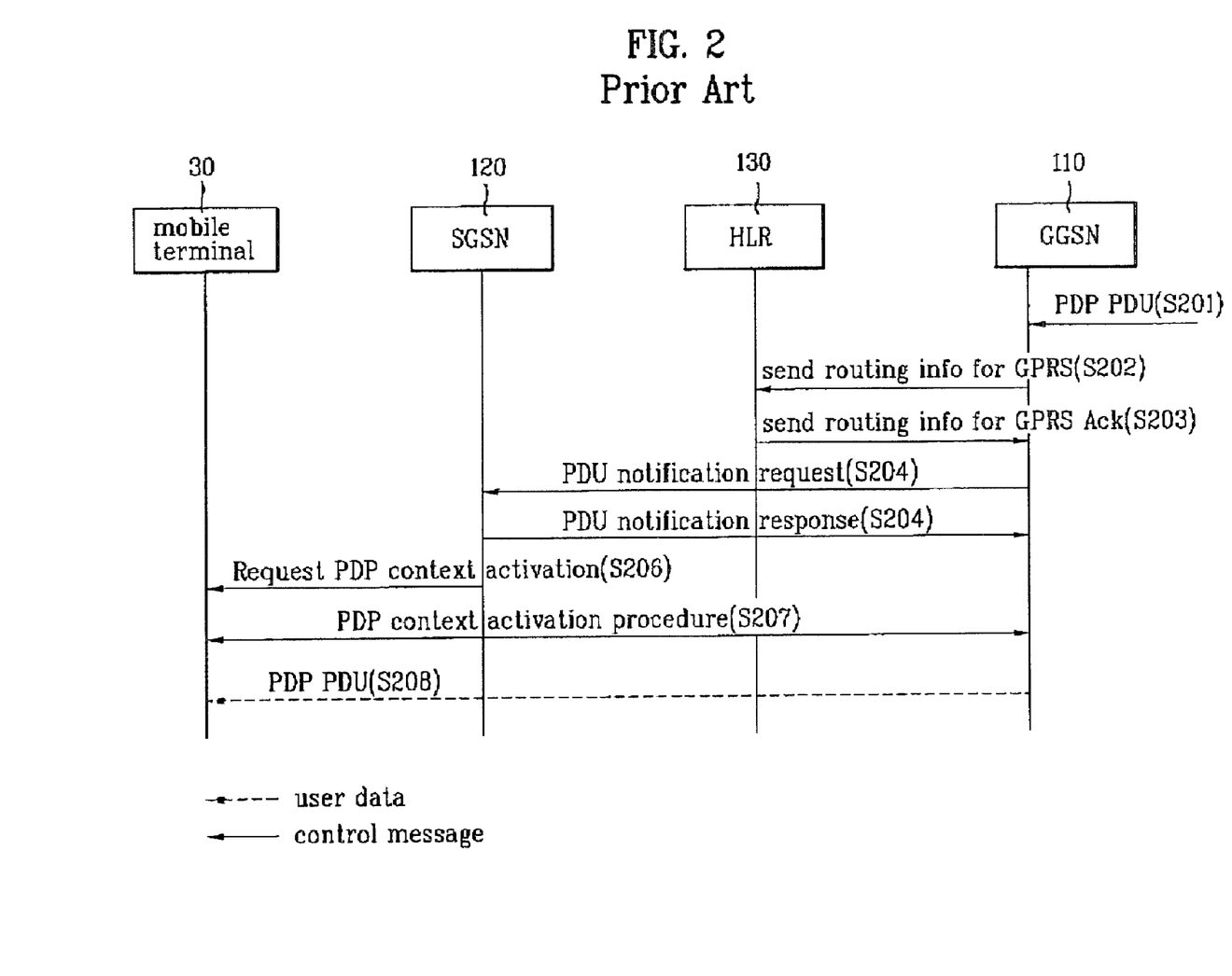
FIG. 2 is a flowchart illustrating a general packet terminating call process in the related-art communication network.

FIG. 2, the manner in which the second packet terminating call process is performed. First, the GGSN 110 judges whether the static information for the PDP address of the received PDP PDU exists based on its own database when the PDP PDU is received (step S201). If so, the GGSN transmits a "Send Routing Info for GPRS" message for querying the HLT 130 about the location information of the terminating subscriber (step S202). In response to the "Send Routing Info for GPRS" message, the HLR 130 transmits a "Send Routing Info for GPRS Acknowledgement" message for providing an address of the corresponding SGSN 120 to which the terminating subscriber belongs to the GGSN 110 (step S203).

Next, the GGSN 110 attempts a packet terminating call request by transmitting a "PDU Notification Request" message to the SGSN 120 based on the received address (step S204). The SGSN 120 responds to the "PDU Notification Request" message by transmitting a "PDU Notification Response" message to the GGSN 110 (step S205), and then requests a packet terminating call connection by transmitting a "Request PDP Context Activation" message to the corresponding mobile terminal 30 of the terminating subscriber through the BSC 140 and the BS 150 (step S206).

The mobile terminal 30 performs a mutual PDP context activation procedure with the GGSN 110 according to the request (step S207), and then receives the received PDP PDU from the GGSN 110 (step S208).

When the communication network as shorn in FIG. 1 intends to set a packet terminating call for providing a PDP PDU to mobile terminals, a certain mobile terminal does not know information on the PDP PDU related to the packet terminating call set request at all. Thus, it should accept a set request for the corresponding packet terminating call in order to receive the PDP PDU. For the first time after the packet terminating call is set, the mobile terminal can receive the PDP PDU from the GGSN, and confirm the type of the received PDP PDU.

According to a result of confirmation, the mobile terminal can maintain or release the set call. That is, the mobile terminal can use the packet radio service in a passive manner. Thereafter, if PDP PDUs of the same type as the above-described PDP PDU is continuously received, the mobile terminal should repeatedly perform a call release procedure. Thus, it may not receive a packet radio service of a desired type. Continuous receipt of the PDP PDUs of such a non-desired type may simultaneously occur in all the mobile terminals of the GPRS network, or may be intentionally produced by an ill-intentioned Internet user.

The related-art technique as described above therefore has at least the following problems.

First, the mobile terminal may continuously receive PDP PDUs of a non-desired type, and this causes the GGSN to repeatedly inquire of the HLR about subscriber information and location information in order to provide the PDP PDUs to the corresponding mobile terminals, thereby producing a great load.

Second, a call release procedure according to the PDP PDUs of a non-desired type is repeatedly performed, and this causes waste of wire/radio resources.

Third, the mobile terminal cannot actively use the packet radio service.

Fourth, the degree of occupation of a specified mobile terminal or terminal group becomes high by an ill-intentioned Internet user, and this causes the performance of the whole system to deteriorate.

SUMMARY OF THE INVENTION

An object of the present invention is to provide a method and apparatus for controlling a packet terminating call in a mobile communication system that substantially obviates one or more problems due to limitations and disadvantages of the related art.

Another object of the present invention is to provide a method and apparatus for controlling a packet terminating call in a mobile communication system that enables a subscriber to selectively receive a packet terminating call addressed to the subscriber himself/herself.

Another object of the present invention is to provide a method and apparatus for controlling a packet terminating call in a mobile communication system that reduces the load of nodes of a packet network, for instance, a GPRS network.

Still another object of the present invention is to provide a method and apparatus for controlling a packet terminating call in a mobile communication system that improves the use efficiency of wire/radio resources.

To achieve these and other objects and advantages of the present invention, a method of controlling a packet terminating call in a mobile communication system includes the steps of registering packet terminating call filtering information for each subscriber, if a packet addressed to a certain subscriber as a destination is received, determining whether to set a terminating call of the received packet based on the registered packet terminating call filtering information, and setting the terminating call according to a result of determination.

The packet terminating call filtering information includes information on whether to activate use of a packet terminating call filtering function, information indicating whether the packet terminating call filtering information is a non-permission condition or a permission condition, and packet pattern information.

The packet pattern information, for example, may be composed of a combination of at least one of a specified source Internet protocol (IP), a specified protocol identifier (ID), and a destination port number, or may be composed of a combination including at least one of various kinds of packet attributes recorded on a header of a packet.

The packet attribute includes a source address and subnet mask, a protocol number (IPv4)/next header (IPv6), a destination port range, a source port range, an IPSec security parameter index (SPI), a type of service (TOS) (IPv4)/a traffic class (Ipv6) and mask, and a flow label (IPv6).

The packet terminating call filtering information is included in static information of the GGSN.

The step of registering the packet terminating call filtering information, for example, may enable receiving of a packet terminating call filtering information message from a mobile terminal of the subscriber, and registration of the packet terminating call filtering information based on the received message. Also, the step of registering the packet terminating call filtering information may enable authentication of a subscriber connected through the Internet, receipt of the packet terminating call filtering information message from the authenticated subscriber, and registration of the packet terminating call filtering information based on the received message.

In another aspect of the present invention, in a method of controlling a packet terminating call in a mobile communication system, a method of inquiring and/or updating packet terminating call filtering information, for example, may includes the steps of receiving a packet terminating call filtering information inquiry and/or update message from a mobile terminal of a subscriber, inquiring and/or updating the registered packet terminating call filtering information based on the inquiry and/or update message, and transferring a result of inquiry and/or update to the mobile terminal. Also, the method of inquiring and/or updating packet terminating call filtering information may includes the steps of receiving a packet terminating call filtering information inquiry and/or update message from an authenticated subscriber, inquiring and/or updating the packet terminating call filtering information based on the inquiry and/or update message, and transferring a result of inquiry and/or update to the authenticated subscriber.

In still another aspect of the present invention, an apparatus for controlling a packet terminating call in a mobile communication system includes a database for storing routing information and filtering information of a protocol data unit for a packet radio service, a terminating call control section for controlling a terminating call setting for the protocol data unit based on the routing information and the filtering information, a message processing section for performing an inquiry and/or update of the filtering information based on an inquiry message and/or update message of the filtering information, and an Internet protocol processing section for processing the protocol data unit and performing the terminating call setting procedure under the control of the terminating call control section. The apparatus further includes an agent for providing the inquiry message and/or update message of the filtering information from an Internet subscriber and/or a mobile terminal, and an Internet host, connected between the agent and the Internet, for enabling the Internet subscriber and/or mobile terminal to connect to the agent.

It is to be understood that both the foregoing general description and the following detailed description of the present invention are exemplary and explanatory and are intended to provide further explanation of the invention as claimed.

DETAILED DESCRIPTION OF THE INVENTION

Figure 3:
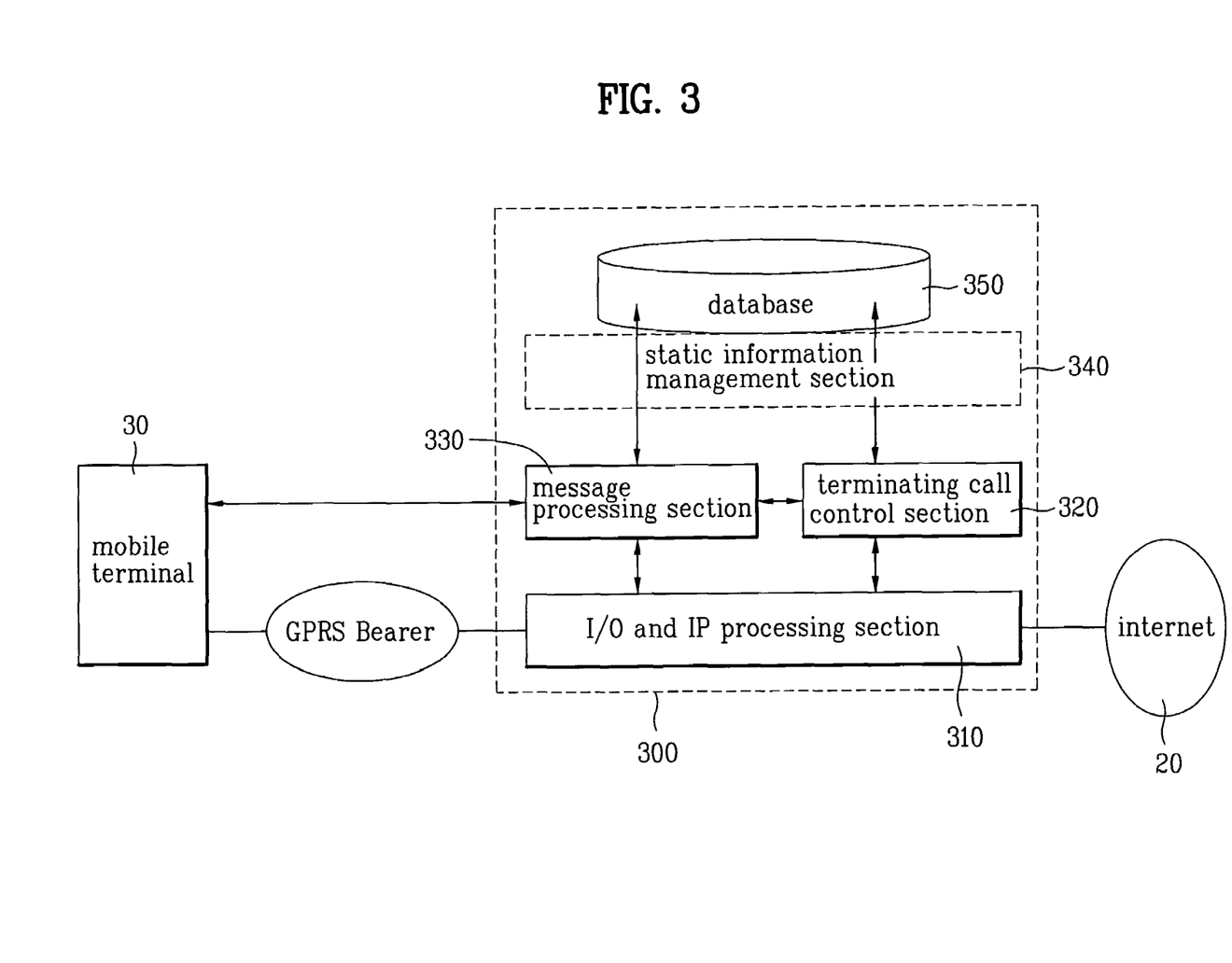
FIG. 3 is a block diagram illustrating an apparatus for controlling a packet terminating call in a mobile communication system according to an embodiment of the present invention.

FIG. 3 is a block diagram illustrating an apparatus for controlling a packet terminating call in a mobile communication system according to an embodiment of the present invention. This figure also shows a GGSN structure included in a packet terminating call control apparatus.

The GGSN 300 according to the present invention includes an input/output (I/O) and Internet protocol (IP) processing section 310, a terminating call control section 320, a message processing section 330, a static information management section 340, and a database 350.

The I/O and IP processing section 310 receives a PDP PDU, an inquiry message for packet terminating call filtering information, and an update message for the packet terminating call filtering information, informs the terminating call control section 320 that the PDP PDU is received, and informs the message processing section 330 that the packet terminating call filtering information inquiry message or the packet terminating call filtering information update message is received. The I/O and IP processing section 310 also transfers a result of inquiring the packet terminating call filtering information and/or a result of judging whether to update the packet terminating call filtering information transferred from the message processing section 330 to a corresponding mobile terminal or an Internet subscriber, performs a procedure of setting a terminating call to the corresponding terminal for the PDP PDU according to a control signal transferred from the terminating call control section 320, and transmits the PDP PDU encoded according to a GPRS tunneling protocol—user (GTP-U) method based on the set call to a corresponding destination.

The terminating call control section 320 recognizes a packet terminating call setting request by receiving the PDP PDU through the I/O and IP processing section 310, judges whether the IP address of the PDP PDU is in an IP address range in which a terminating service for a packet radio service can be provided, and then judges in addition whether there is static information on the PDP address of the PDP PDU. The terminating call control section 320 controls the I/O and IP processing section 310 based on results of judgment and the packet terminating call filtering information in the static information.

The message processing section 330 inquires or updates the packet terminating call filtering information stored in the database 350 through the static information management section 340 based on the contents of the filtering information inquiry message and the filtering information update message provided from the I/O and IP processing section 310, generates and transfers to the I/O and IP processing section 310 the result of inquiring the packet terminating call filtering information or the result of judging whether to update the packet terminating call filtering information.

The static information management section 340 manages information stored in the database 350, and stores routing information for providing the PDP PDU transferred from the Internet 20 to the corresponding destination, static information for static subscribers, and packet terminating call filtering information set through the subscriber mobile terminal or the Internet. The packet terminating call filtering information is stored in a manner that it is included in the static information.

The static information stored in the database 350 includes an IP address field, an international mobile subscriber identity (IMSI) field, and a packet terminating call filtering information field as shown in Table 1 below.

TABLE 1

| IP Address | IMSI Field | Packet Destination Call Filtering Information Field |
|---|---|---|
| 150.150.1.1 | 450000134550001 | Activation/Inactivation Information<br>Permission Condition Information<br>Source IP: 150.150.1.0/24<br>Protocol Identifier: TCP<br>Destination Port No.: 8080 |

The packet terminating call filtering information field includes first information that indicates whether to activate the use of the packet terminating call filtering function, second information that indicates whether the corresponding packet pattern information recorded in the packet terminating call filtering Information field refers to a rejection condition or a permission condition if the packet terminating call filtering function is activated, and third information that is the packet pattern information includes a combination of various kinds of packet pattern attributes such as a source IP, protocol ID, destination Port Number, etc.

The packet pattern information includes a combination of various kinds of packet attributes recorded in an IP header and a transmission control protocol (TCP)/user datagram protocol (UDP) header of the PDP PDU as shown in Table 2 below.

TABLE 2

| Packet Terminating Call Filter Attributes | Valid Combination | | |
|---|---|---|---|
| | I | II | III |
| Source Address and Subnet Mask | X | X | X |
| Protocol Number (IPv4)/Next Header (IPv6) | X | X | |
| Destination Port Range | X | | |
| Source Port Range | X | | |
| IPSec Security Parameter Index (SPI) | | X | |
| Type of Service (TOS) (Ipv4)/Traffic | X | X | X |
| Flow Label (IPv6) | | | X |

In Table 2, it can be recognized that the packet pattern information includes a combination of a source address and subnet mask attribute, protocol number (IPv4)/next header (IPv6) attribute, destination port range attribute, source port range attribute, IPSec security parameter index (SPI) attribute, type of service (TOS) (IPv4)/traffic class (IPv6) and mask attribute, and flow label (IPv6) attribute.

That is, the valid combination type I of the packet pattern information includes a combination of a source address and subnet mask attribute, protocol number (IPv4)/next header (IPv6) attribute, destination port range attribute, source port range attribute, and type of service (TOS) (IPv4)/traffic class (IPv6) and mask attribute.

The valid combination type II of the packet pattern information includes a combination of a source address and subnet mask attribute, protocol number (IPv4)/next header (IPv6) attribute, IPSec security parameter index (SPI) attribute, type of service (TOS) (IPv4)/traffic class (IPv6) and mask attribute.

The valid combination type III of the packet pattern information includes a combination of a source address and subnet mask attribute, protocol number (IPv4)/next header (IPv6) attribute, type of service (TOS) (IPv4)/traffic class (IPv6) and mask attribute, and flow label (IPv6) attribute.

Figure 4:
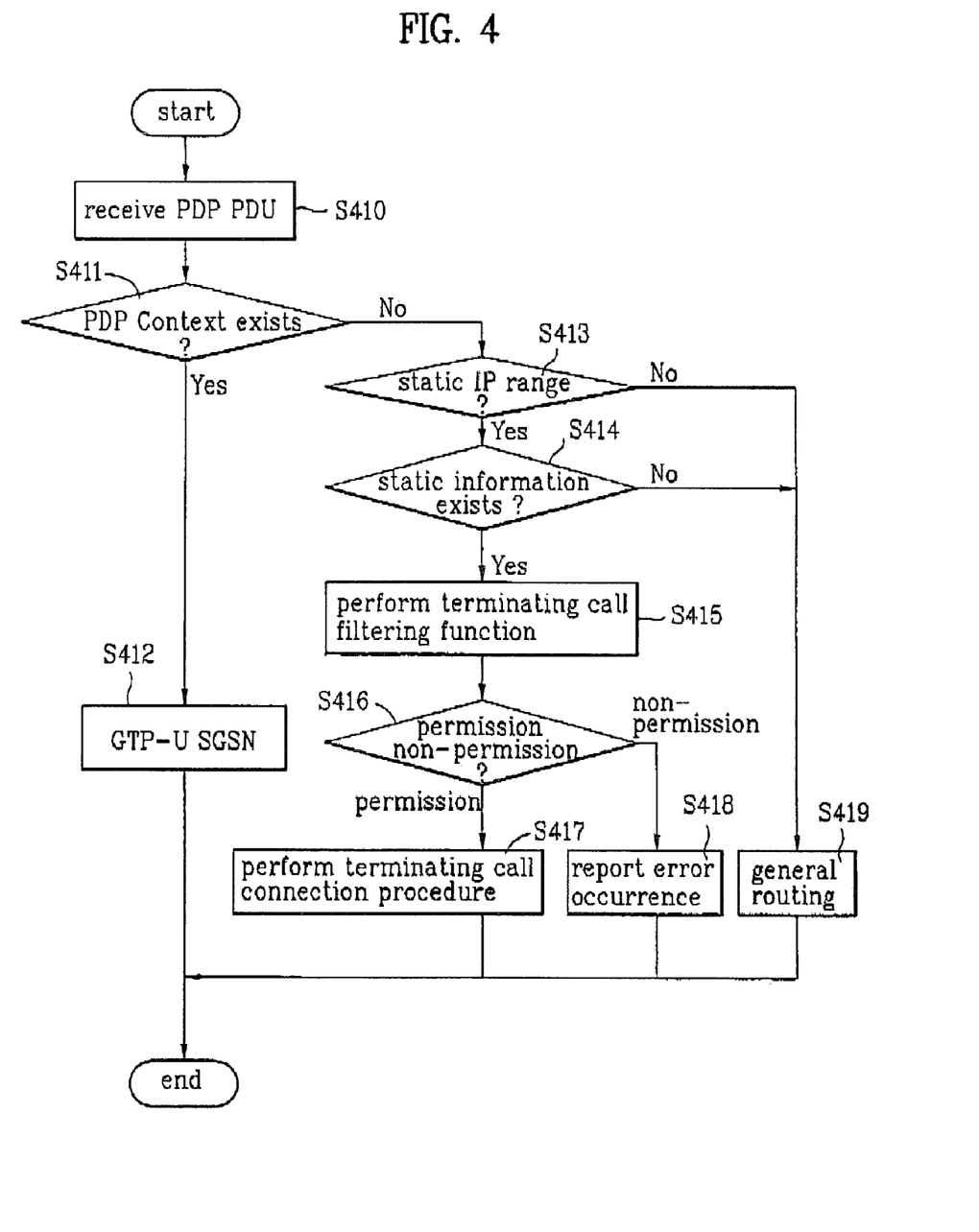
FIG. 4 is a flowchart illustrating a method of controlling a packet terminating call in a mobile communication system according to an embodiment of the present invention.

FIG. 4 is a flowchart illustrating a method of controlling a packet terminating call in a mobile communication system according to an embodiment of the present invention. This figure also shows a packet terminating call control method in the GGSN 300 of FIG. 3.

First, if a PDP PDU is received from the Internet (step S410), the GGSN judges whether a PDP context for a PDP address exists in the received PDP PDU (step S411).

Generally, a session means a logical connection for communications, and the SGSN and GGSN have a plurality of PDP contexts for one session. If the transmission of PDP PDUs is requested from a mobile terminal or a network, the SGSN and GGSN transmit the PDP PDUs of the corresponding session to the corresponding destination based on the contents of the PDP contexts.

Thus, if the corresponding PDP context exists as a result of judgment at step S411, the GGSN encodes the received PDP PDUs according to the GTP-U method. The GGSN then transfers the encoded PDP PDU to the corresponding SGSN that is providing the present service to the destination mobile terminal (step S412).

However, if the corresponding PDP context does not exist as a result of judgment at step S411, the GGSN judges whether the IP range of the PDP PDU is the static IP range in which the terminating service of the packet radio service can be provided (step S413).

If the IP range IP range is the static IP range as a result of judgment at step S413, the GGSN judges whether the static information for the PDP address of the destination of the PDP PDU exists (step S414). If the static information exists, the GGSN checks packet attributes included in the header of the PDP PDU based on filtering activation information and packet terminating call filtering information included in the static information, and judges whether or not to accept or reject the terminating call connection request for the PDP PDU (steps S415 and S416).

If the packet terminating call connection request is accepted as a result of the judgment performed at step S416, the GGSN performs the general packet terminating call connection process, which has previously been explained with reference to FIG. 2 (step S417). If the packet terminating call connection request is not accepted, the GGSN reports to the Internet that an error has occurred in performing the packet terminating call connection (step S418).

More specifically, at step S417, the packet terminating call connection procedure to the corresponding destination of the PDP PDU is performed through the process of FIG. 2. Here, the GGSN inquires of the HLR about the location information of the destination mobile terminal, obtains the address of the SGSN to which the destination mobile terminal belongs in response to the inquiry, and requests the connection of the terminating call to the SGSN of the obtained address. The SGSN requests activation of the PDP context to the destination mobile terminal, and the terminating call connection is completed when the PDP context activation procedure is terminated. Based on the connected terminating call, the GGSN transfers the PDP PDU to the destination mobile terminal.

In contrast, at step S418, the normal packet terminating call connection procedure as described above is not performed, but rather transfer of the received PDP PDU to the destination is intercepted through an error process.

Meanwhile, if the IP range of the PDP PDU is not the static IP range in which the terminating service of the packet radio service can be provided as a result of judgment at step S413, or if there is no static information of the PDP address for the corresponding destination of the PDP PDU as a result of judgment at step S414, the GGSN transfers the PDP PDU to the corresponding destination according to the general routing method.

Figure 5:
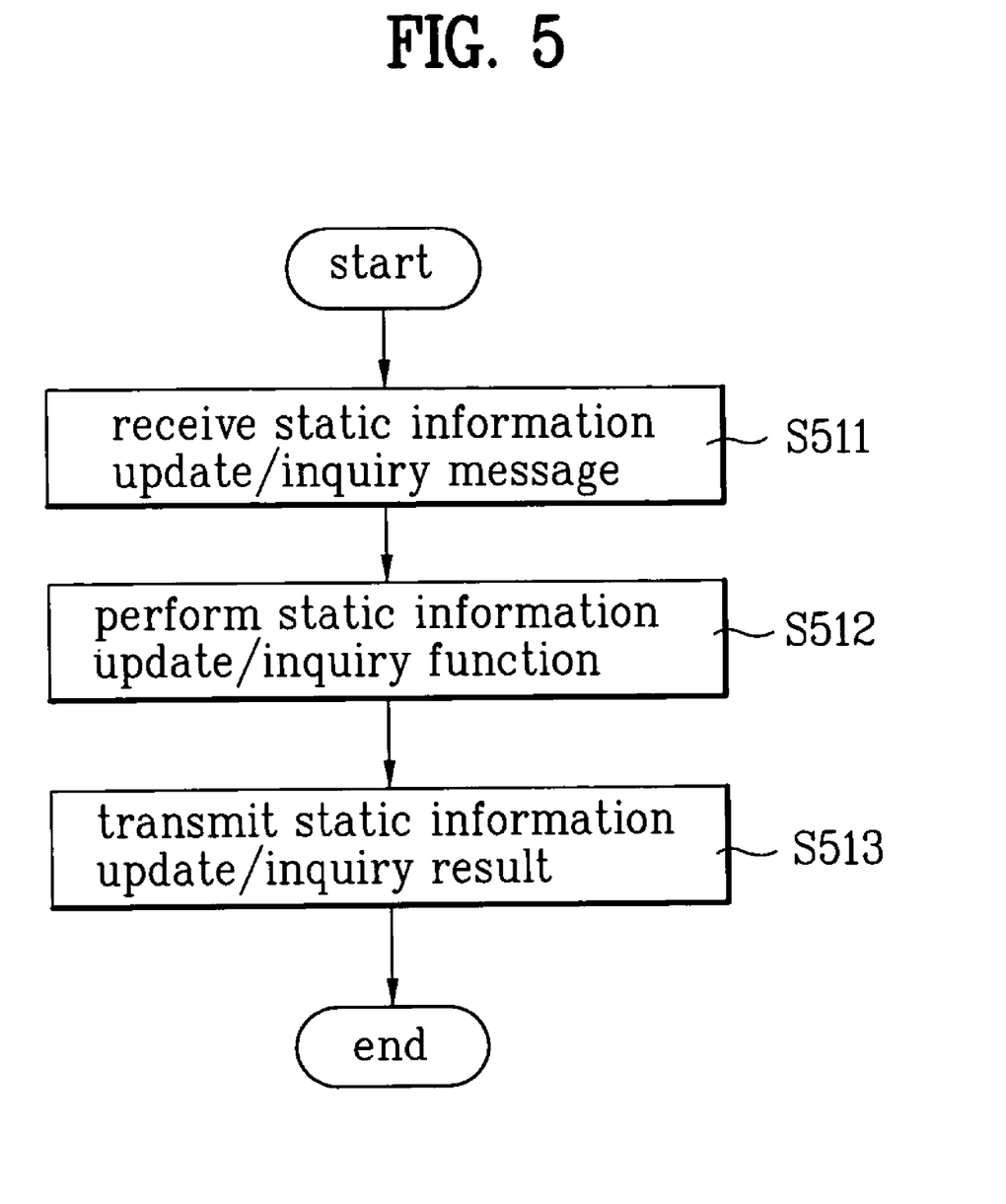
FIG. 5 is a flowchart illustrating a method of updating/inquiring packet terminating call filtering information in a GGSN 300 in a method of controlling a packet terminating call in a mobile communication system according to an embodiment of the present invention.

FIG. 5 is a flowchart illustrating a method of updating/inquiring packet terminating call filtering information in the GGSN 300 in the method of controlling a packet terminating call in a mobile communication system according to an embodiment of the present invention.

First, if an update and/or inquiry message of the packet terminating call filtering information is received from the subscriber mobile terminal or the Internet (step S511), the GGSN performs the inquiring and/or updating of the packet terminating call filtering information according to the contents of the received message (step S512), and transmits results of the inquiry and/or update to the corresponding mobile terminal or the Internet subscriber (step S513).

Figure 6:
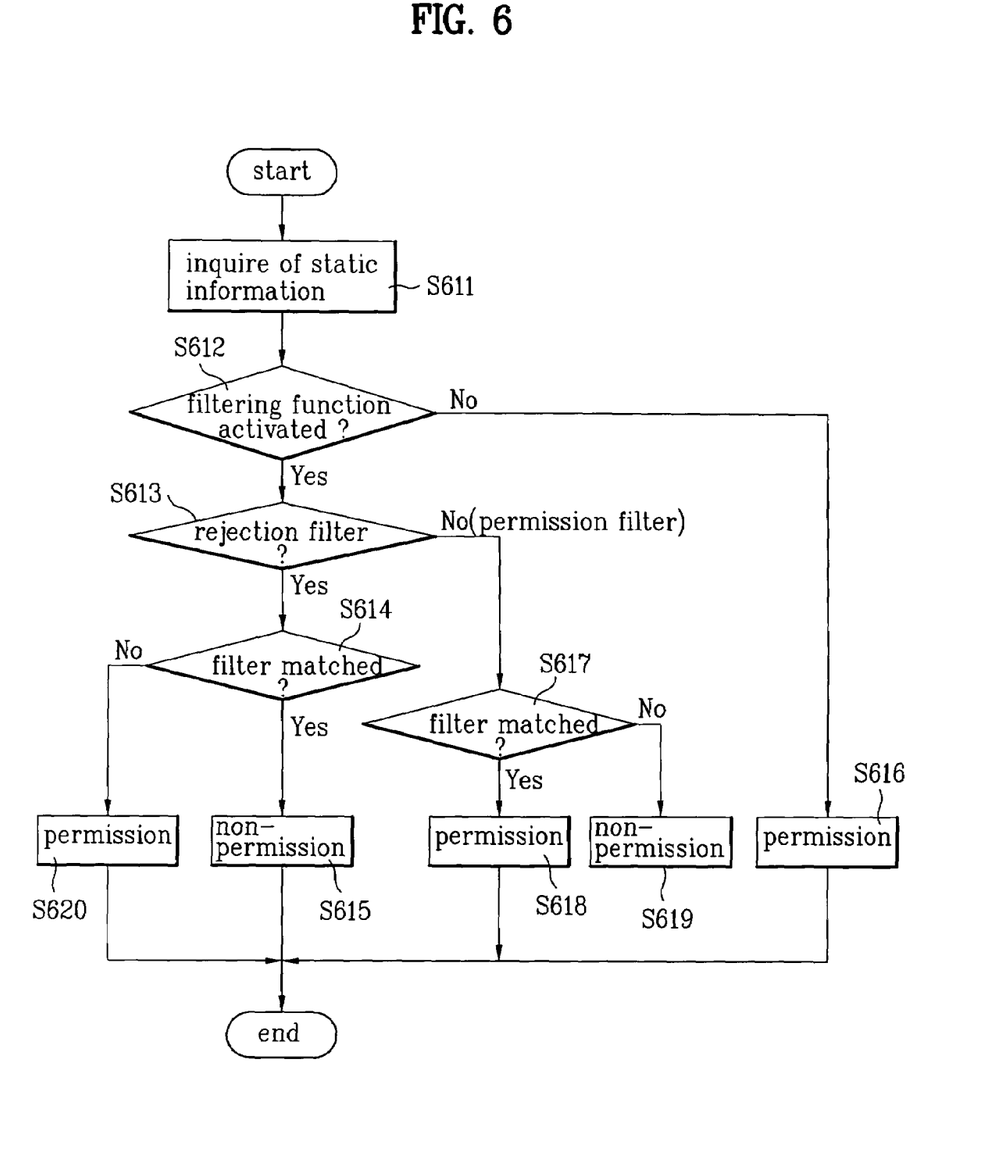
FIG. 6 is a flowchart illustrating a packet terminating call process in a terminating call control section 320 of a GGSN 300 in a method of controlling a packet terminating call in a mobile communication system according to the present invention.

FIG. 6 is a flowchart illustrating a packet terminating call process in a terminating call control section 320 of the GGSN 300 of FIG. 3 in the method of controlling a packet terminating call in a mobile communication system according to the present invention.

If it is judged that there is static information for the mobile terminal corresponding to the destination of the received PDP PDU, the control section 320 inquires about the static information (step S611).

If the packet terminating call filtering function for the packet terminating call connection to the corresponding mobile terminal is activated as a result of inquiry (step S612), and if the packet pattern information on the activated packet terminating call filtering information refers to a rejection filter (step S613), the control section checks whether the packet pattern information matches the packet pattern attribute information recorded on the header of the PDP PDU (step S614). If so, the control section transfers a control signal indicating that the terminating call connection is impossible to the I/O and IP processing section 310. The I/O and IP processing section 310 informs the Internet that an error occurs in the terminating call connection process for the PDP PDU (step S615).

If the filtering function is deactivated as a result of the judgment performed at step S612, the control section transfers a control signal indicating that the terminating call connection request for the PDP PDU is accepted to the I/O and IP processing section 310. The I/O and IP processing section 310 performs the terminating call connection procedure to the mobile terminal corresponding to the destination of the PDP PDU through the process of FIG. 2 (step S616).

If the packet pattern information on the activated packet terminating call filtering information refers to a permission filter as a result of the judgment at step S613, the control section checks whether the packet pattern information matches the packet pattern attribute information recorded on the header of the PDP PDU (step S617). If so, the control section transfers a control signal indicating that the terminating call connection request for the PDP PDU is accepted to the I/O and IP processing section 310. The I/O and IP processing section 310 performs the terminating call connection procedure to the mobile terminal corresponding to the destination of the PDP PDU through the process of FIG. 2 (step S618). In contrast, if the packet pattern information does not match the packet pattern attribute information as a result of judgment at step S617, the control section transfers a control signal indicating that the terminating call connection is impossible to the I/O and IP processing section 310. The I/O and IP processing section 310 informs the Internet that an error occurs in the terminating call connection process for the PDP PDU (step S619).

If the packet pattern information does not match the packet pattern attribute information recorded on the header of the PDP PDU as a result of the judgment at step S614, the control section transfers the control signal indicating that the terminating call connection request for the PDP PDU is accepted to the I/O and IP processing section 310. The I/O and IP processing section 310 performs the terminating call connection procedure to the mobile terminal corresponding to the destination of the PDP PDU through the process of FIG. 2 (step S620).

Figure 7:
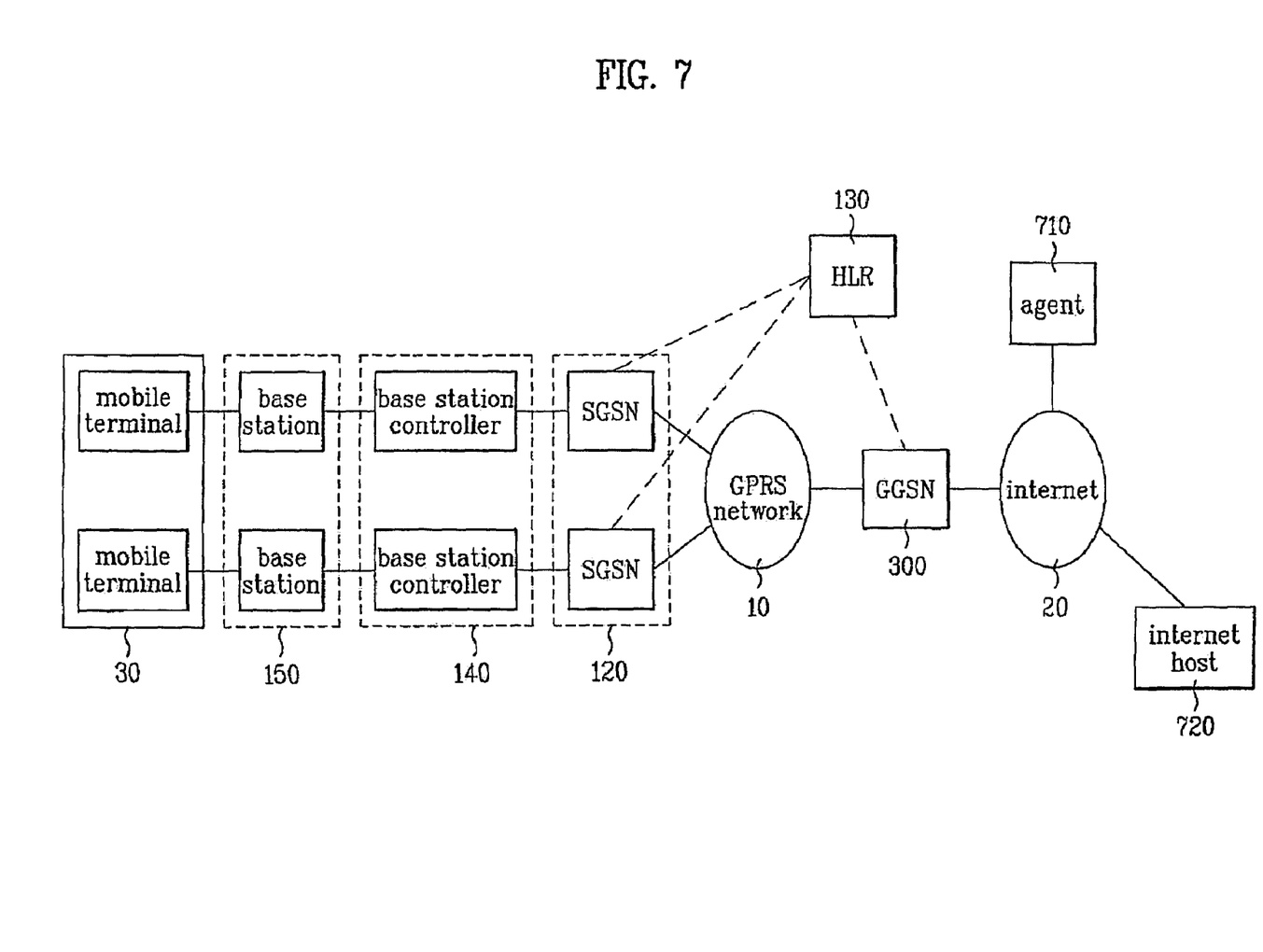
FIG. 7 is a block diagram illustrating a system and procedure for updating/inquiring packet terminating call filtering information according to the present invention.

FIG. 7 is a block diagram illustrating a system and procedure for updating/inquiring the packet terminating call filtering information according to one embodiment of the present invention. There are at least two methods for changing the packet terminating call filtering information included in the static information of the GGSN 300. One is a method using a control plane of the GGSN 300, and the other is a method using the Internet service. Each of these methods are described below in seriatim.

The first method defines a format of a control information message and a transmission procedure for sending/receiving a control message between the mobile terminal 30 and the GGSN 300. According to this procedure, a control message is transmitted from the mobile terminal to the GGSN along a signal path that passes through the base station, the base station controller, the SGSN, and the GPRS network. The GPRS network then transmits the control message to the GGSN to access or change the packet terminating call filtering information stored in the GGSN.

The second method is to use an Internet host 720. A subscriber can use the internet host to connect to an agent 710 through Internet 20. The agent then establishes a connection to GGSN 300 through the dotted arrow connection. Access and/or changes to the packet terminating call filtering information stored in the GGSN can be made based on information transmitted along this signal path.

More specifically, agent 710 performs authentication of the mobile terminal or subscriber that has requested the inquiry and/or update of the packet terminating call filtering information. If it is a valid subscriber or mobile terminal, the inquiry and/or update of the packet terminating call filtering information is transferred to the GGSN 300.

The message processing section 330 of the GGSN 300 inquires or updates the packet terminating call filtering information in the static information stored in the database via the static information management section 340. Section 330 also informs the agent 710 of the results of the inquiry and update of the filtering information. Accordingly, the agent 710 informs the subscriber and mobile terminal of the results of the inquiry and update.

One reason why the agent 710 is additionally employed is to solve security problems that may occur when the GGSN 300 is directly exposed to the ill-intentioned Internet user. By this agent 710, only the subscriber who has passed the authentication procedure can inquire or update his/her own terminating call filtering information using the Internet. Also, the agent 710 can be used in case of the service expansion.

The packet terminating call control method and apparatus in a mobile communication system according to the present invention therefore has at least the following advantages.

First, since the subscriber can selectively receive the packet terminating call addressed to himself/herself, he/she can actively use the packet radio network service.

Second, since packets unnecessary to the subscriber are early intercepted, the load of GPRS network nodes is reduced and the use efficiency of wire/radio resources is improved.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of controlling a packet call in a mobile communication system, comprising:
    registering packet call filtering information for storage in a database located within or coupled to a gateway general radio service (GPRS) support node (GGSN), the packet call filtering information including a plurality of combinations of packet-pattern attributes;
    receiving a packet addressed to a mobile terminal of a subscriber,
    determining whether to set a call connection of the received packet based on a comparison of attribute information of the received packet and the plurality of combinations of packet-pattern attributes included in the registered packet call filtering information;
    activating one of a rejection filter or a permission filter based on information stored in the packet call filtering information; and
    setting the call connection according to a result of determination and the activated filter, wherein the rejection filter blocks setting of the call if the comparison of the attribute information of the received packet matches one of the plurality of combinations of the packet-pattern attributes, and the permission filter blocks the call to be set if the comparison of the attribute information of the received packet does not match any of the plurality of combinations of the packet-pattern attributes, wherein said method further comprises:
    transmitting control information from an internet host to an agent along a first signal path;
    transmitting the control information from the agent to the GGSN along a second data path; and
    changing or setting at least one of the packet-pattern attributes of the packet call filtering information in the database based on the control information received by the GGSN, wherein the control information is set by the subscriber of the mobile terminal without using the mobile terminal.

2. The method of claim 1, wherein the packet call filtering information includes information indicating whether to activate use of a packet call filtering function.

3. The method of claim 1, wherein the packet-pattern attributes include at least one of a specified source Internet protocol (IP), a specified protocol identifier (ID), or a destination port number.

4. The method of claim 1, wherein the attribute is recorded in a header of the received packet.

5. The method of claim 4, wherein the packet-pattern attributes include a source address and subnet mask.

6. The method of claim 4, wherein the packet-pattern attributes include a protocol number (IPv4) attribute and a header (IPv6) attribute.

7. The method of claim 4, wherein the packet-pattern attributes include a destination port range.

8. The method of claim 4, wherein the packet-pattern attributes include a source port range.

9. The method of claim 4, wherein the packet-pattern attributes include an Internet Protocol Security (IPSec) security parameter index (SPI).

10. The method of claim 4, wherein the packet-pattern attribute-patterns include a type of service (TSO) (IPv4) and a traffic class (IPv6) and mask.

11. The method of claim 4, wherein the packet-pattern attributes include a flow label (IPv6).

12. The method of claim 1, further comprising:
    receiving at least one of a packet call filtering information inquiry or update message from a mobile terminal of a subscriber;
    performing at least one of an inquiring or updating operation for the registered packet call filtering information based on the inquiry and/or update message; and
    transferring a result of the inquiry and/or updating operation to the mobile terminal.

13. The method of claim 1, wherein said method further comprises:
    authenticating the subscriber of the mobile terminal connected to the GGSN through the agent and Internet host before changing or setting at least one of the packet-pattern attributes of the packet call filtering information.

14. The method of claim 1, further comprising:
    receiving a packet call filtering information inquiry and/or update message from an authenticated subscriber;
    performing at least one of an inquiring or updating operation for the packet call filtering information based on the inquiry and/or update message; and
    transferring a result of inquiry and/or updating operation to the authenticated subscriber.

15. The method of claim 1, wherein the plurality of combinations include different numbers of the packet-pattern attributes or different arrangements of packet-pattern attributes.

* * * * *